(12) United States Patent
Matz et al.

(10) Patent No.: US 7,661,118 B2
(45) Date of Patent: **\*Feb. 9, 2010**

(54) METHODS, SYSTEMS, AND PRODUCTS FOR CLASSIFYING SUBSCRIBERS

(75) Inventors: William R. Matz, Atlanta, GA (US); Scott R. Swix, Duluth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/247,246

(22) Filed: Oct. 8, 2008

(65) Prior Publication Data

US 2009/0070225 A1    Mar. 12, 2009

Related U.S. Application Data

(63) Continuation of application No. 10/016,988, filed on Dec. 14, 2001, now Pat. No. 7,444,658.

(51) Int. Cl.
*H04N 7/025* (2006.01)
*G06F 3/00* (2006.01)
*G06F 13/00* (2006.01)

(52) U.S. Cl. .............. 725/46; 725/34; 725/25; 725/40

(58) Field of Classification Search .......... 725/34, 725/35, 40, 46
See application file for complete search history.

(56) References Cited

U.S. PATENT DOCUMENTS

| | | |
|---|---|---|
| 4,697,209 A | 9/1987 | Kiewit |
| 5,251,324 A | 10/1993 | McMullan |
| 5,382,970 A | 1/1995 | Kiefl |
| 5,440,334 A | 8/1995 | Walters et al. |
| 5,444,499 A | 8/1995 | Saitoh |
| 5,446,919 A | 8/1995 | Wilkins |
| 5,497,185 A | 3/1996 | Dufresne et al. |
| 5,504,519 A | 4/1996 | Remillard |
| 5,532,732 A | 7/1996 | Yuen et al. |
| 5,589,892 A | 12/1996 | Knee et al. |
| 5,596,994 A | 1/1997 | Bro |
| 5,606,359 A | 2/1997 | Youden et al. |

(Continued)

FOREIGN PATENT DOCUMENTS

WO    WO 9222983    12/1992

(Continued)

*Primary Examiner*—Hunter B. Lonsberry
(74) *Attorney, Agent, or Firm*—Scott P. Zimmerman PLLC

(57) ABSTRACT

Methods, systems, and products are disclosed for classifying a subscriber. An event record is formed comprising at least one command from at least one subscriber and a time associated with the at least one command. Data describing the at least one event record is merged with data describing media programming to form data describing an event timeline that describes the at least one command and the media programming selected by the at least one subscriber over a period of time. Purchasing data describing the at least one subscriber's purchase is retrieved and compared to the data describing the event timeline. The at least one subscriber is classified in a category when the data describing the event timeline indicates that the at least one subscriber viewed an advertisement and the purchasing data indicates that the at least one subscriber afterwards purchased an advertised product or service.

20 Claims, 7 Drawing Sheets

U.S. PATENT DOCUMENTS

| | | | |
|---|---|---|---|
| 5,661,516 A | 8/1997 | Carles | |
| 5,752,159 A | 5/1998 | Faust | |
| 5,774,170 A | 6/1998 | Hite et al. | |
| 5,796,952 A | 8/1998 | Davis | |
| 5,798,785 A | 8/1998 | Hendricks et al. | |
| 5,850,249 A | 12/1998 | Massetti et al. | |
| 5,872,588 A | 2/1999 | Aras | |
| 5,945,988 A | 8/1999 | Williams | |
| 5,948,061 A | 9/1999 | Merriman et al. | |
| 5,991,735 A | 11/1999 | Gerace | |
| 5,991,799 A | 11/1999 | Yen et al. | |
| 6,026,368 A | 2/2000 | Brown et al. | |
| 6,029,045 A | 2/2000 | Picco | |
| 6,029,195 A | 2/2000 | Herz | |
| 6,160,570 A | 12/2000 | Sitnik | |
| 6,163,644 A | 12/2000 | Owashi et al. | |
| 6,177,930 B1 | 1/2001 | Chernock | |
| 6,177,931 B1 | 1/2001 | Alexander | |
| 6,202,210 B1 | 3/2001 | Ludtke | |
| 6,252,586 B1 | 6/2001 | Freeman | |
| 6,279,157 B1 | 8/2001 | Takasu | |
| 6,286,042 B1 | 9/2001 | Hasselberg et al. | |
| 6,353,929 B1 | 3/2002 | Houston | |
| 6,397,057 B1 | 5/2002 | Malackowski et al. | |
| 6,457,010 B1 | 9/2002 | Eldering | |
| 6,463,585 B1 | 10/2002 | Hendricks et al. | |
| 6,487,538 B1 | 11/2002 | Gupta et al. | |
| 6,698,020 B1 | 2/2004 | Zigmond et al. | |
| 6,718,551 B1 | 4/2004 | Swix et al. | |
| 6,738,978 B1 | 5/2004 | Hendricks et al. | |
| 6,950,804 B2 | 9/2005 | Strietzel | |
| 6,970,641 B1 | 11/2005 | Pierre | |
| 6,976,268 B2 | 12/2005 | Courtney | |
| 6,983,478 B1 | 1/2006 | Grauch | |
| 7,000,245 B1 | 2/2006 | Pierre | |
| 7,010,492 B1 | 3/2006 | Bassett et al. | |
| 7,020,336 B2 | 3/2006 | Cohen-Solal | |
| 7,020,652 B2 | 3/2006 | Matz | |
| 7,039,599 B2 | 5/2006 | Merriman | |
| 7,039,932 B2 | 5/2006 | Eldering | |
| 7,086,075 B2 | 8/2006 | Swix | |
| 7,212,979 B1 | 5/2007 | Matz et al | |
| 2001/0004733 A1 | 6/2001 | Eldering | |
| 2002/0056109 A1 | 5/2002 | Tomsen | |
| 2002/0056118 A1 | 5/2002 | Hunter et al. | |
| 2002/0083441 A1 | 6/2002 | Flickinger et al. | |
| 2002/0123928 A1 | 9/2002 | Eldering | |
| 2002/0143647 A1 | 10/2002 | Headings | |
| 2003/0093792 A1 | 5/2003 | Labeeb et al. | |
| 2003/0110489 A1 | 6/2003 | Gudorf et al. | |
| 2004/0261127 A1 | 12/2004 | Freeman | |
| 2005/0278741 A1 | 12/2005 | Robarts et al. | |
| 2006/0075456 A1 | 4/2006 | Gray | |

FOREIGN PATENT DOCUMENTS

| | | |
|---|---|---|
| WO | WO 98/31114 | 7/1998 |
| WO | WO01/47156 | 6/2001 | ively
METHODS, SYSTEMS, AND PRODUCTS FOR CLASSIFYING SUBSCRIBERS

CROSS REFERENCE TO RELATED APPLICATIONS

This application is a continuation of U.S. application Ser. No. 10/016,988, filed Dec. 14, 2001, and now issued as U.S. Pat. No. 7,444,658, which is incorporated herein by reference in its entirety. This application is also related to the following applications: U.S. application Ser. No. 10/017,111, filed Dec. 14, 2001; U.S. application Ser. No. 10/017,742, filed Dec. 14, 2001; U.S. application Ser. No. 10/017,630, filed Dec. 14, 2001 and now issued as U.S. Pat. No. 7,587,323; U.S. application Ser. No. 10/017,640, filed Dec. 14, 2001; U.S. application Ser. No. 10/020,779, filed Dec. 14, 2001; U.S. application Ser. No. 09/861,595, filed May 22, 2001; and U.S. application Ser. No. 09/496,825, filed on Feb. 1, 2000 and now issued as U.S. Pat. No. 6,983,478, which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The invention relates to a system and method for targeting content sent to a user.

BACKGROUND

Brand recognition achieved through advertisements is important to many businesses. As a result, consumers are often overwhelmed by the volume of advertisements seen on television, in magazines, on the global computer network (commonly referred to as the "Internet"), and other media venues.

Capturing the attention of consumers amid the clutter of other advertisements is of great importance to businesses seeking to promote a brand. Easily remembered slogans have been used in television, radio, and magazine advertisements for many years. Many memorable commercials have gained recognition in popular culture for their lasting impressions on consumers.

In order for an advertisement to be valuable, however, it is not enough that consumers recognize the brand. A successful advertisement should increase actual sales of the product. If a product's market comprises only a small number of consumers, an advertisement is of very little value if it is not viewed by the relatively small group of consumers who purchase the product. For example, an advertisement for denture adhesive is only valuable if it is viewed by consumers who wear dentures or purchase denture adhesive for family members. In addition, advertisement time is used very inefficiently if an advertisement for a product used by a small set of consumers is viewed by a large number of consumers. Although showing the advertisement to a large group of consumer may reach the smaller group who may actually purchase the product, the advertisement time is wasted on the consumers who are unlikely to purchase the product.

One method for reaching consumers who are likely to purchase a product while minimizing the wasted exposure to consumers who are unlikely to purchase a product is to place an advertisement in a media that the targeted customers are likely to be viewing. Information regarding consumer groups is collected and analyzed using numerous methods. This information is then used to predict consumer habits in a targeted group. For example, a company selling denture adhesive could determine that the majority of its customers are over age sixty-five. An advertising consultant might advise such a company that consumers over age sixty-five are likely to watch television shows including professional golf. Based on this information, the company selling denture adhesive concentrates its advertisements during professional golf tournaments. Decisions regarding when and where to place an advertisement may be even less scientific. For example, numerous commercials for automobiles and automobile accessories typically are placed during stock car races because advertisers assume that stock car race enthusiasts also enjoy purchasing and modifying automobiles. Similarly, advertisements for children's toys are placed in children's television shows.

Although placing advertisements in a particular television show targets consumers who are likely to watch the show, such targeting is not a precise approach. The viewers of any particular show may not be a homogeneous group. For example, certainly not all viewers of professional golf tournaments wear dentures. Even in a well-understood demographic audience, many of the viewers of the show will be unlikely to purchase the product.

In addition, recent technological advances have diminished the value of advertisements shown in the middle of a television show. With the wide availability of video cassette recorders ("VCRs") and digital video records ("DVRs"), viewers record television shows and may "fast-forward" the tape through the commercials. Television remote controls also allow viewers to watch other channels during commercials and then return to the television show.

One response to the diminished value of advertisements shown in the middle of television shows is commonly referred to as "product placement." Product placement involves placing a particular product directly in a television show or movie. Brand recognition is attained when viewers see a favorite actor drinking a particular brand of soft drink.

Another technological advance in advertisements involves super-imposing an image into the television program. This technique is especially common in sporting events, and allows numerous ads to be placed in the same location. In the past, advertisers purchased a space for an advertisement strategically placed in the sporting event space, for example, behind home plate in a baseball game. The advertisement would be highly visible to viewers watching the game on television. More recently, several advertisers may purchase the space behind home plate in a baseball game. The advertisement is superimposed into the video feed such that the advertisement is seen by viewers. The advertisement may be changed at any point during the broadcast.

Efforts have also been made to target advertisements to consumers on the Internet. Various mechanisms are used to record the viewing habits of a user at a particular user terminal. The content of the pages viewed is analyzed to determine what topics are of interest to a user. Advertisement are placed on the pages viewed by the user based on these particular topics of interest. These advertisements are often placed around the primary text or image in a web page and are commonly referred to as "banner ads."

Although the Internet environment enables advertisements targeted specifically for an individual user, rather than a general demographic expected in viewers of a specific television show, targeted advertisements in the Internet environment have proven to be ineffective for capturing a viewers attention. Viewers are typically interested in the information on the web page and ignore the banner advertisements.

Advertisements on television, including product placements, are generally effective for capturing a viewer's attention. However, such advertisements are typically displayed to a disproportionately large number of viewers who are unlikely to purchase the product. Targeted advertisements on the Internet have the advantage of being displayed to consumers who have demonstrated some interest in the relevant product. However, advertisements displayed on the Internet have proven relatively ineffective in capturing the attention of an audience. A consumer using the Internet easily ignores Internet advertisements.

These and other problems are avoided and numerous advantages are provided by the methods and systems of the present invention.

SUMMARY OF THE INVENTION

The present invention comprises methods and systems for targeting advertisements. In one embodiment, the method involves defining a match between a user classification for characterizing a user and the user's behavior and an advertisement. A system collects user data about a user associated with a user terminal such as a television, set top box, or computer terminal. The user data includes data from a plurality of sources. Examples of data sources include information about purchases made by the user such as records of the products purchased, prices paid, and the time of purchases ("sales data"), information about media viewing habits of the user, information about demographics, and other information describing the user. The system then classifies the user in a user classification and transmits media content to the user terminal. Examples of user classifications include classifications based on interests such as sports, music, or comedy, classifications based on products or brands that a user purchases, and classifications based on demographics such as marital and family status, income level, or gender. The media content includes video. The system inserts an advertisement into the media content if a match is defined between the user classification and the advertisement. The advertisement is one that is of interest to the users in the user classification.

In another embodiment, the system differentiates between two or more users who use the same user terminal. The system receives a user identification to determine which user is viewing the media. The system defines a match between a user classification and an advertisement. The system then classifies the user in a user classification and transmits media content to the user terminal. The system inserts an advertisement into the media content if a match is defined between the user classification and the advertisement. Therefore, the system differentiates between a plurality of users who view media content from the same terminal at different times.

In still another embodiment, the user data further includes sales data of the user. A system detects the relationship between the sales data and the user viewing selections. Examples of sales data include information regarding credit card purchases, online purchases, and purchases of other retail products. Sales data may include the prices paid for products and the time that the purchase was made by the user. The user is classified in a user classification if a relationship is detected between the user sales data and user viewing selections. In one embodiment, a relationship between the sales data and user viewing selections is detected if the user views advertisements for a product and then purchases the product.

In yet another embodiment, the user is classified in a user classification if the user data satisfies a predefined parameter.

In still another embodiment, the step of inserting the advertisement includes embedding the advertisement into media content. For example, a product placed in a television show may be switched with a different brand.

In various embodiments, the user data includes global computer network viewing data, survey data, or sales data. In other embodiments, the advertisement includes an image embedded into media content, a video program or a banner.

Systems and methods according to the present invention provide for the integration of information about a user from multiple sources. Relationships between these sources are detected. For example, a relationship between the sales data of a user and the viewing selections of a user may be detected by a system, and the user classified based on the relationship. Therefore, a system can detect if a user purchases products for which advertisements have been viewed. Systems and methods according to the present invention also enable embedding an advertisement into media content transmitted to the user. Thus, different product placement advertisements in a television show may be transmitted to different viewers in a viewing system.

Advertisers will pay more for advertisements that are targeted for a specific viewing audience. In addition, the same advertisement slot may be sold to multiple advertisers. For example, a television show in which a character holds a soft drink container could be shown to one user showing one brand of soft drink while another user may see a second brand of soft drink. Because both brands are paying for the advertisement space, a larger amount of revenue may be collected.

These and other advantages will become apparent to those of ordinary skill in the art with reference to the detailed description and drawings.

DETAILED DESCRIPTION

According to the present invention, advertisements are selectively sent to user terminals based on a user classification. According to an embodiment of the present invention, a system defines matches between user classifications and an advertisement. Data is collected from a plurality of sources, which may be cross referenced to determine relationships, for example, between user actions and viewing selections. A system classifies a user, defines matches between an advertisement and a user classifications, transmits media content to a user terminal, and inserts the advertisement into the media content if a match has been defined between the user classification and the advertisement classification.

Figure 1:
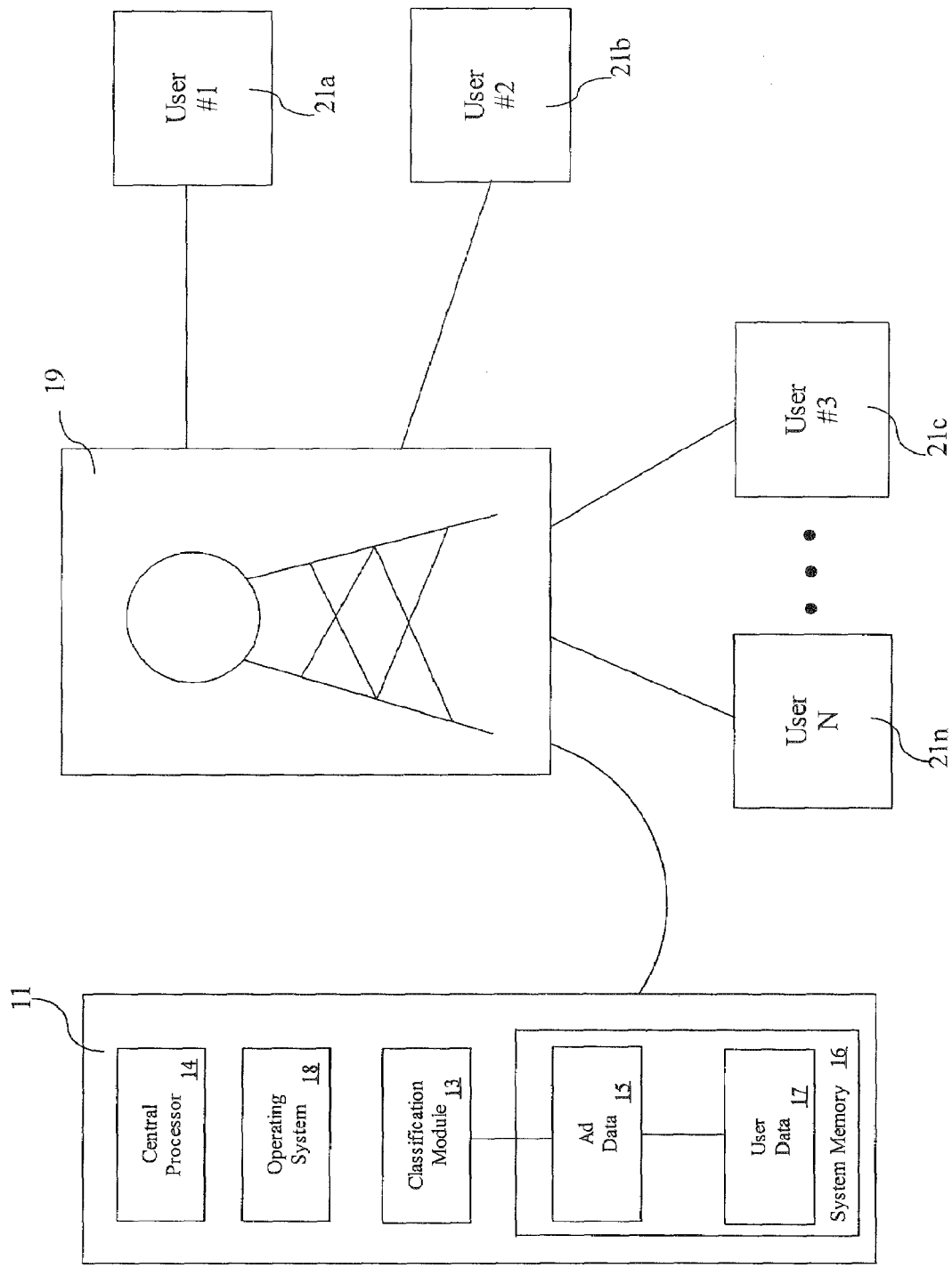
FIG. 1 is a block diagram of an exemplary network for transmitting media content to users.

FIG. 1 is a block diagram of an exemplary network for transmitting media content to users. The media content is transmitted from a broadcast station 19 to users at user terminals 21a-21n. The broadcast station 19 may be a television airwave broadcast station or cable broadcast station or other device for broadcasting media content in a media delivery network. In the embodiment shown in FIG. 1, the broadcast station 19 comprises a cable television broadcast station. The media content is generally in the form of video content, but may also include text, video games, and audio content. The media content includes advertisements, which may be in the form of video, a superimposed image, or an advertisement framing other content commonly referred to as a "banner." Banner advertisement may be used, for example, to appear at the same time as an electronic program guide. The media content may be transmitted by cable connections, satellite broadcast, or air wave broadcasts to user terminals 21a-21n.

Users at user terminals 21a-21n select broadcast media content from the user terminals 21a-21n. User terminals 21a-21n may include any network media device for receiving media content, including video display terminals, set-top boxes (often called set-top terminals, cable converters or home communications terminals), televisions, radios or personal computers connectable to the Internet or other media devices for communicating with a media delivery network. In the example shown, user terminals 21a-21n are television sets having a set-top box. User terminals 21a-21n include a user interface for receiving user viewing commands. User terminals 21a-21n send the user viewing selections to the broadcast terminal 19, for example, using the methods and systems disclosed in entitled "System and Method for Utilizing Television Viewing Patterns," entitled "System and Method for Developing Tailored Television Content Related Packages," entitled "System and Method for Identifying Desirable Subscribers."

The broadcast terminal 19 is in communication with a server 11. In the example shown, the broadcast terminal 19 is in communication with the server 11 through a conventional cable television delivery network. The server 11 includes a central processor 14 for controlling and processing various computer functions, an operating system 18 for running software applications, and system memory 16 for storing information. The server 11 also includes a classification module 13 for classifying users and sending instructions to the broadcast station 19. The server 11 also includes advertisement data 15 and user data 17 stored in the system memory 16.

When a user makes a viewing selection at a user terminal 21a-21n, the viewing selections are transmitted to the broadcast station 19 and the server 11. Examples of viewing selections include when a user is watching media content and what media content the user is watching including the channels watched, the programs viewed from the channels watched, and the time that the channel is watched. Viewing selections include how much of a particular television show or advertisement the user watches. User data 17 is a database containing information about a user. The user data 17 is organized using conventional database management techniques. User data 17 includes user viewing selections collected by the user terminals 21a-21n, and other information, as will become apparent from the following discussion. The advertisement data 15 includes information about advertisements, such as identifying information. For example, advertisements may be identified by the product featured, the times of day the advertisement is shown, the demographic audience to which the advertisement is aimed and other information about the advertisement. The advertisement data 15 may be uploaded to the system memory 16 by a system in communication with the server 11 or entered into the system memory 16 through the server 11 by a computer operator. Example of advertisement data 15 include information identifying an advertisement, descriptions of an advertisement, and the times at which an advertisement is broadcast. The advertisements may be broadcast from the broadcast terminal 19. As would be understood by one of ordinary skill in the art, alternative network arrangement may be implemented. For example, the user terminals 21a-21n may be connected to the server 11 directly rather than forming an indirect connection through the broadcast station 19.

Figure 2:
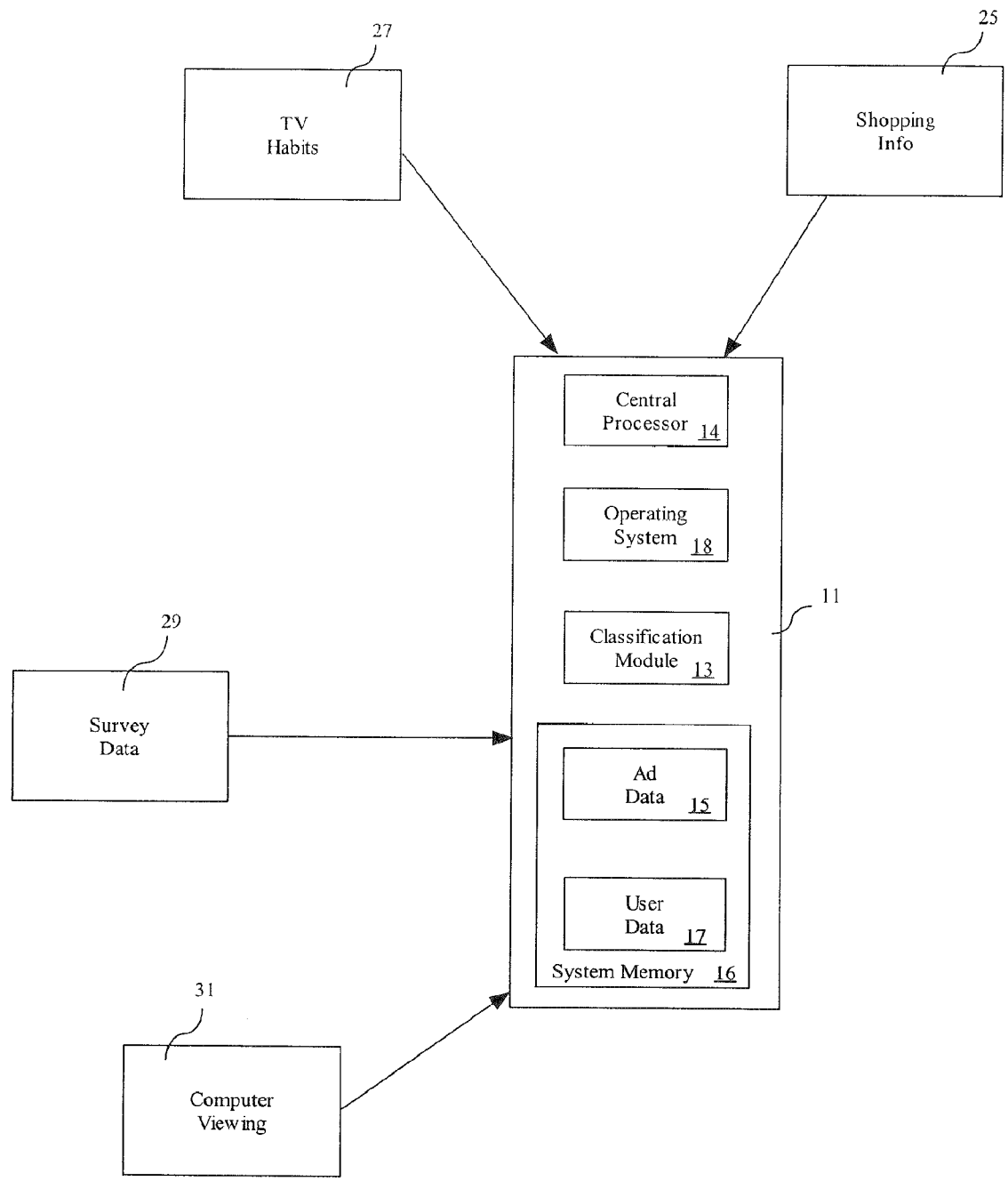
FIG. 2 is a block diagram of an exemplary network for collecting data from a plurality of sources.

FIG. 2 is a block diagram of an exemplary network for collecting data from a plurality of data sources. A data source is any source of information and may include a database and/or a data collection device. Examples of data sources include records of retail purchases such as credit card purchases and online purchases, records of user viewing selections, and records of user information such as demographic information. In addition to the configuration shown in FIG. 1, the server 11 may be connected to a plurality of data sources as depicted in FIG. 2. Each data source contributes data to the user data 17 in the system memory 16. The classification module 13 reads and analyzes the user data 17. Examples of data sources include shopping information 25, television habits 27, survey data 29, and computer viewing information 31. Various configurations may be used to efficiently store and process the user data 17. For example, information about a user may be collected by a device and stored in a temporary memory location, such as a buffer, and uploaded to the user data 17 periodically. In another example, multiple servers or a network of computers may perform the function of the server 11.

Shopping information 25 includes information about the user's shopping habits. Shopping habits may be monitored through credit card purchase records or online electronic purchase records. Retail stores may keep records of purchases by using customer shopping cards in which customers are given discounts in exchange for using a shopping card. The shopping card is scanned every time a customer makes a purchase. Therefore, the customer and the customer's purchases are identified and recorded into a database regardless of whether the customer uses a credit card or debit card for the purchase.

Television habits 27 include information about the user's viewing habits. In one embodiment, a set top box may record television viewing habits using methods and systems described in entitled "System and Method for Utilizing Television Viewing Patterns," entitled "System and Method for Developing Tailored Television Content Related Packages," entitled "System and Method for Identifying Desirable Subscribers," including shows and advertisements viewed. The television habits 27 may include information about how much of a television show or advertisement was viewed, for example, whether a user viewed an entire advertisement or only the first five seconds of the advertisement. In another embodiment, the user manually keeps track of television shows that the user watches and records the television shows in a log.

Survey data 29 includes information collected by surveys about a user. Survey data 29 is collected by surveys, such as online surveys, telephone surveys, or mail-in surveys, and may include personal information about a user such as names, geographic locations, income levels and other demographic information.

Computer viewing information 31 includes information collected about what a user views on a computer. Examples of computer viewing information 31 include web pages viewed by the user on the Internet, Internet shopping purchases, topics of Internet searches, video games played, and other computer activities.

Information is collected from data sources such as shopping information 25, television habits 27, survey data 29 and computer viewing information 31 to the system memory 16 and stored as user data 17. In addition, the classification module 13 analyzes the collected information and stores the analysis in the user data 17.

Figure 3:
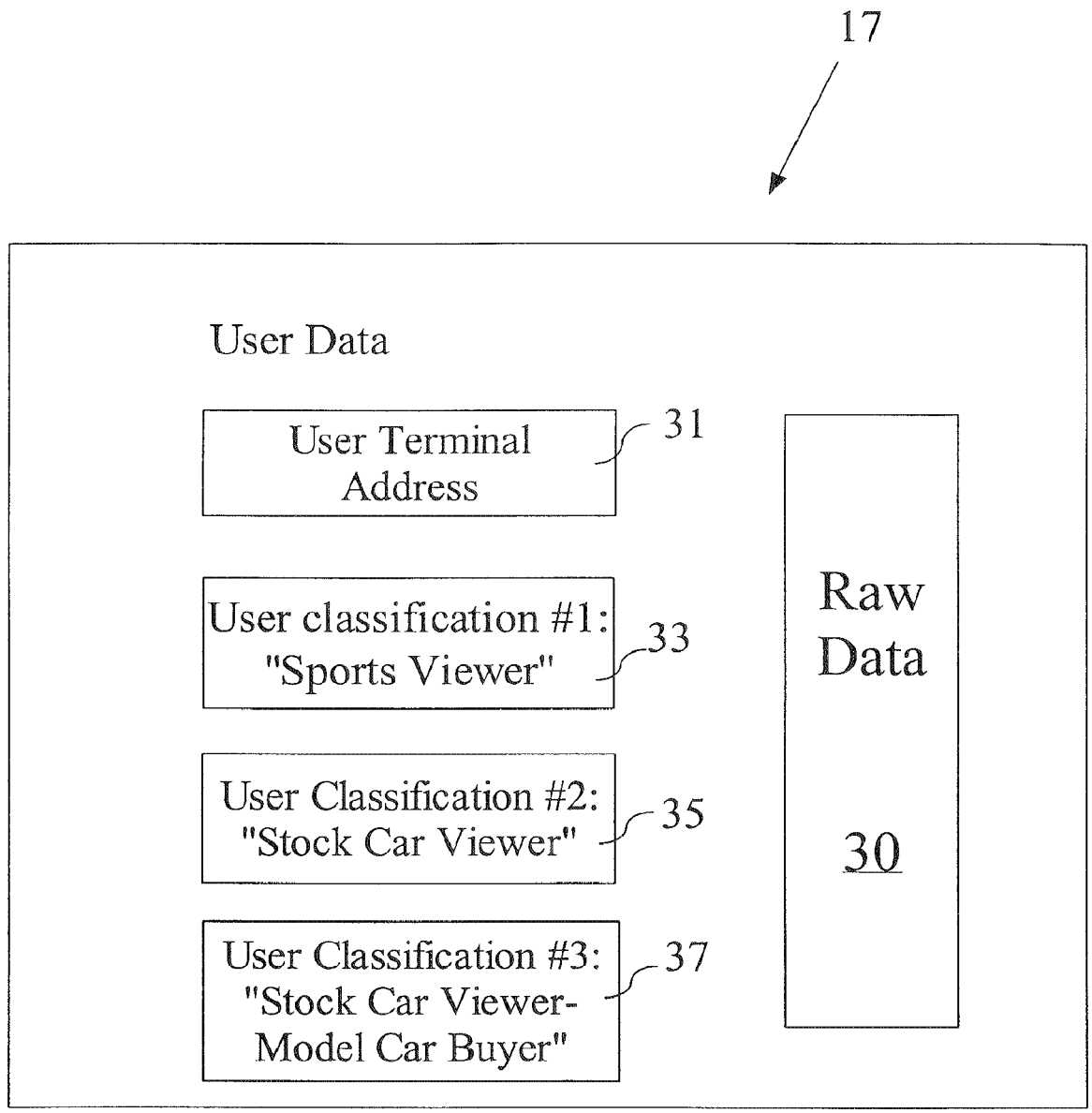
FIG. 3 is a block diagram of user data according to the present invention.

FIG. 3 is a block diagram of user data according to the present invention. In the example depicted in FIG. 3, analyzed classifications of user data 17 are shown. User data 17 includes information about one or more users such as user 32, for example, in one or more data fields. The user data 17 includes raw data 30 about the user collected from the various data sources, such as the data sources depicted in FIG. 2. Referring back to FIG. 3, user 32 includes a user terminal address 31. The user terminal address 31 is an address for identifying the hardware of a user terminal such as the user terminals 21a-21n as depicted in FIG. 1.

In the example depicted in FIG. 3, user 32 is classified into three classifications: a first user classification 33 entitled "sports viewer," a second user classification 35 entitled "stock car viewer," and a third user classification 37 entitled "stock car viewer—model car buyer." The process by which the classification module 13 (FIG. 2) picks a classification is described in greater detail below. Each user classification is associated with a set of parameters for determining whether a particular user should be classified in the user classification. For example, the first user classification 33 entitled "sports viewer" may be defined as any user who watches more than an average of three hours of sports programming per week, the second user classification 35 entitled "stock car viewer" may be defined as any user who watches more than an average of two stock car races per month, and the third user classification 37 entitled "stock car viewer—model car buyer" may be defined as a user who watches more than an average of one stock car race per month and has purchased a model car within the last year.

In the example shown, the first user classification 33 entitled "sports viewer" and the second user classification 35 entitled "stock car viewer" are defined by parameters based on the television habits 27 of the user as shown in FIG. 2. The third user classification 37 entitled "stock car viewer—model car buyer" is defined by parameters based on the shopping information 25 and the television habits 27 of the user as shown in FIG. 2. Any number of user classifications may be defined based on data and information depicted in FIG. 2 such as shopping information 25, television habits 27, survey data 29, computer viewing data 31 or any combination thereof.

Figure 4:
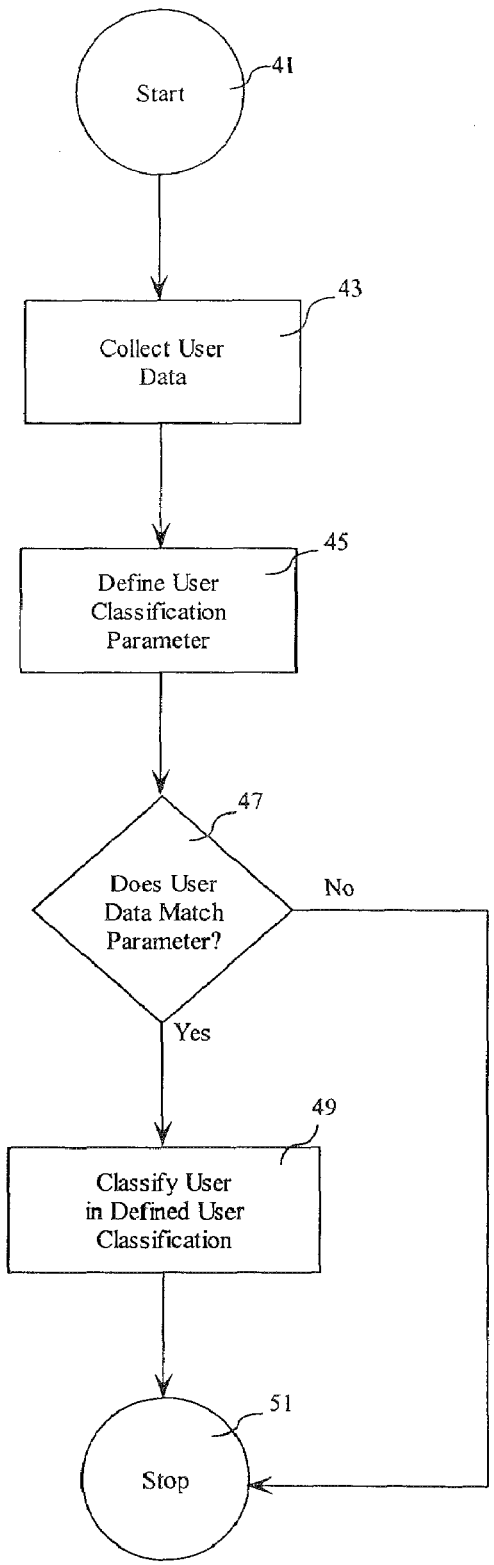
FIG. 4 shows an embodiment of a method according to the present invention.

FIG. 4 shows an embodiment of a method according to the present invention. More specifically, FIG. 4 shows a method for classifying a user performed by the server 11 and various components thereof (FIG. 2). The method starts at step 41. The server collects user data from data sources, such as the data sources depicted in FIG. 2 at step 43. Data from the data sources is transferred to a database such as user data 17 in FIG. 2. The user data 17 is organized using conventional database management techniques. Referring back to FIG. 4, at step 45 the classification module 13 (FIG. 2) includes a definition of a user classification parameter. User classification parameters are defined characteristics that are used to classify a user. An example of a user classification and corresponding classification parameter is a sports fan with a classification parameter that requires a predefined level of sports viewing. For example, if the classification parameter for a sports fan is three hours of sports viewing per week, then a user will be classified as a sports fan only if the user views at least three hours of sports per week. The user classification parameter may be a defined term in the classification module or defined by accepting input from an operator as a variable into the classification module.

The classification module 13 compares the user data and the parameters at step 47. If the user data matches the parameter at step 47, the user is classified in the defined user classification at step 49. The classification module 13 records the classification as user data 17. If the user data does not match the user parameter at step 47, then the classification module 13 stops at step 51. The process depicted in FIG. 4 may be repeated for many classifications and many users. The classification module 13 may classify a user into a plurality of classifications using the process depicted in FIG. 4. The various classifications are recorded as user data 17. For example, each user has a data field in the user data 17 database for storing information about the user, including the relevant user classifications. The user classifications are used to determine which advertisements should be sent to the user.

EXAMPLE 1

In one illustrative example of the application of classification module 13, the user views a stock car race every Saturday and Sunday afternoon, and the classification module analyzes the user data to determine if the user should be classified as a "sports viewer." In the example, the user classification parameter for a sports viewer is a requirement that the user view at least three hours of sports shows on average per week.

The classification module first examines whether the user is a sports viewer beginning at step 41 in FIG. 4. The user data is collected at step 43, which includes information that the user views a stock car race every Saturday and Sunday afternoons. The races average three and a half hours each. The classification module determines that the user data, specifically, watching two three and a half hour races a week, matches the user classification parameter requirement that the user view at least three hours of sports shows on average per week at step 47. Therefore, the user is classified as a sports viewer by the classification module 13 at step 49 and the classification module stops at step 51.

The classification module 13 then adds the classification "sports viewer" to the user data in a configuration such as the user data 17 depicted in FIG. 3, which includes a first user classification 33 of "sports viewer." This information is valuable to an advertiser because the user may be targeted for specific advertisements of particular interest to sports fans. Similarly, additional user classifications may be added to further refine the information, such as a user classification for "stock car viewer."

Figure 5:
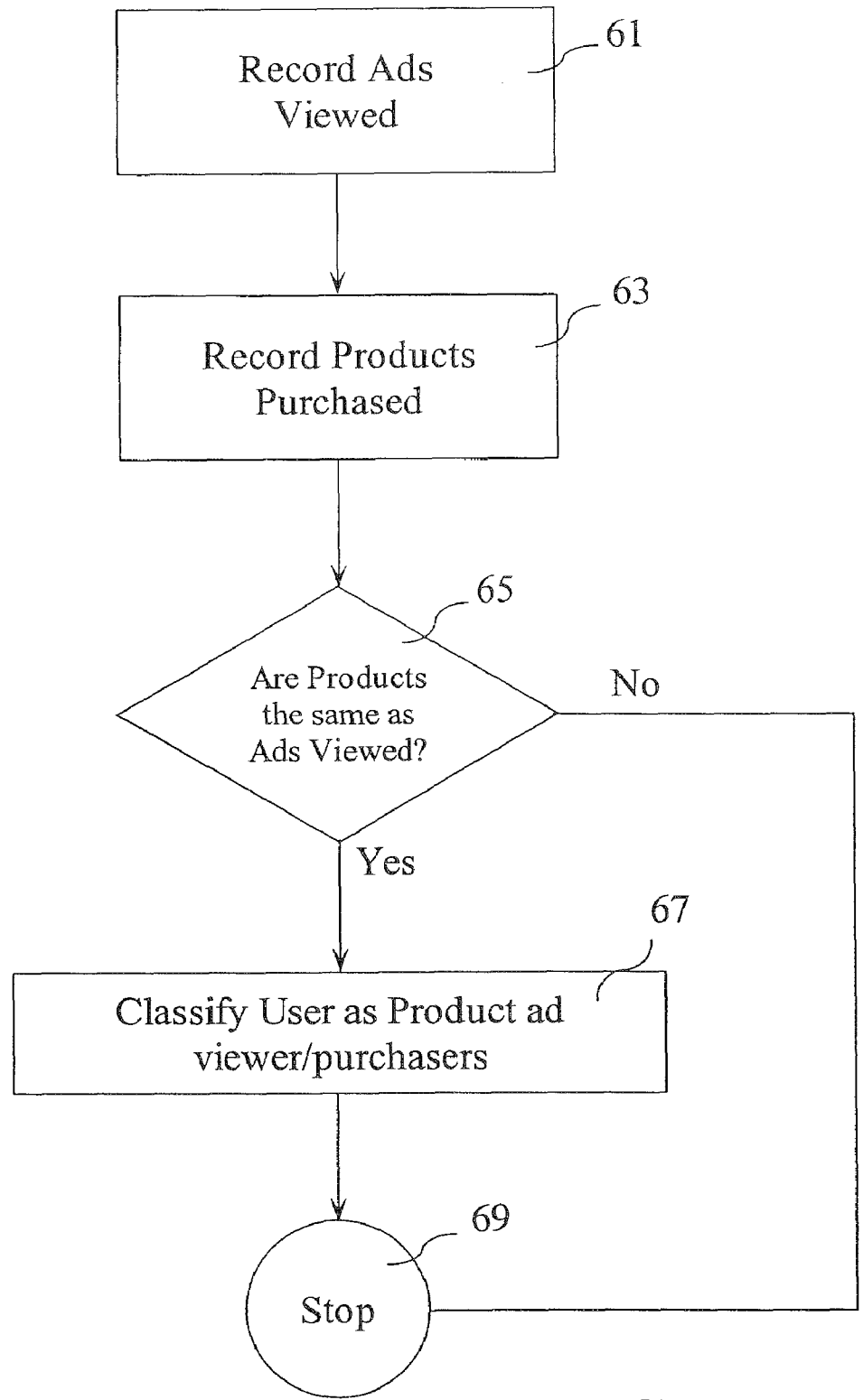
FIG. 5 shows another alternative embodiment of a method according to the present invention.

FIG. 5 shows another alternative embodiment of a method according to the present invention for correlating user data 17 from a plurality of sources to classify a user. The user data 17 as shown in FIG. 2 includes information about the advertisements that a particular user viewed from the television habits 27 and products purchased from the shopping information 25. Referring back to FIG. 5, the server 11 (FIG. 2) records advertisements viewed at step 61 and products purchased at step 63. At step 65, the classification module compares the products purchased and the advertisements viewed. For example, the advertisement is for a specific product, and if the product purchased is the same as the product featured in the advertisement at step 65, then there is a match between the products purchased and the advertisements viewed. The classification module 13 classifies the user as an advertisement viewer/purchaser for the particular product at step 67 and stops at step 69.

EXAMPLE 2

In an illustrative example for correlating user data 17 from a plurality of sources to classify a user, referring to FIG. 2, the user data 17 collects television habits 27 through the server 11 which indicate that the user has viewed ten advertisements for Brand A soft drinks and twenty advertisements for Brand B soft drinks in one month. The user data 17 collects shopping information 25 from the user's grocery store shopping records indicating that the user buys two liters of Brand B soft drinks twice a month.

Referring back to FIG. 5, the server records advertisements viewed, specifically, ten advertisements for Brand A and twenty advertisements for Brand B at step 61. The server collects products purchased, specifically, two liters of Brand B soft drinks twice a month, at step 63. At step 65, the classification module examines whether the products purchased are the same as the advertisements viewed. Because the user views advertisements for Brand B and buys Brand B, the user is classified as a Brand B advertisement viewer/purchaser at step 67. The user is not classified with respect to Brand A because the user does not buy Brand A. The classification module stops at step 69.

The classification of a user as an advertisement viewer/purchaser is valuable to purchasers and sellers of advertisement. The user may be targeted for specific advertisements based on the classification and the user's subsequent purchasing habits could be monitored. For example, based on Example 2, Brand A could decide to deliver more advertisements to the user and monitor the user's shopping information to determine if the user switches brands. On the other hand, if a user watches many advertisements for a product and never purchases the product, the user may not be receptive of the advertisements. Based on this information, people who market the product may decide to stop sending advertisements to a user who never purchases the product despite viewing advertisements because such advertising does not appear to influence the user. Products purchased and advertisements viewed may be included as a user classification parameter, for example, in the method depicted in FIG. 4. A predefined level of advertisements watched or products purchased may be required for a user to be classified. For example, the user classification parameter may be a requirement that the user view a defined number of advertisements and purchase a defined amount of the product.

Figure 6:
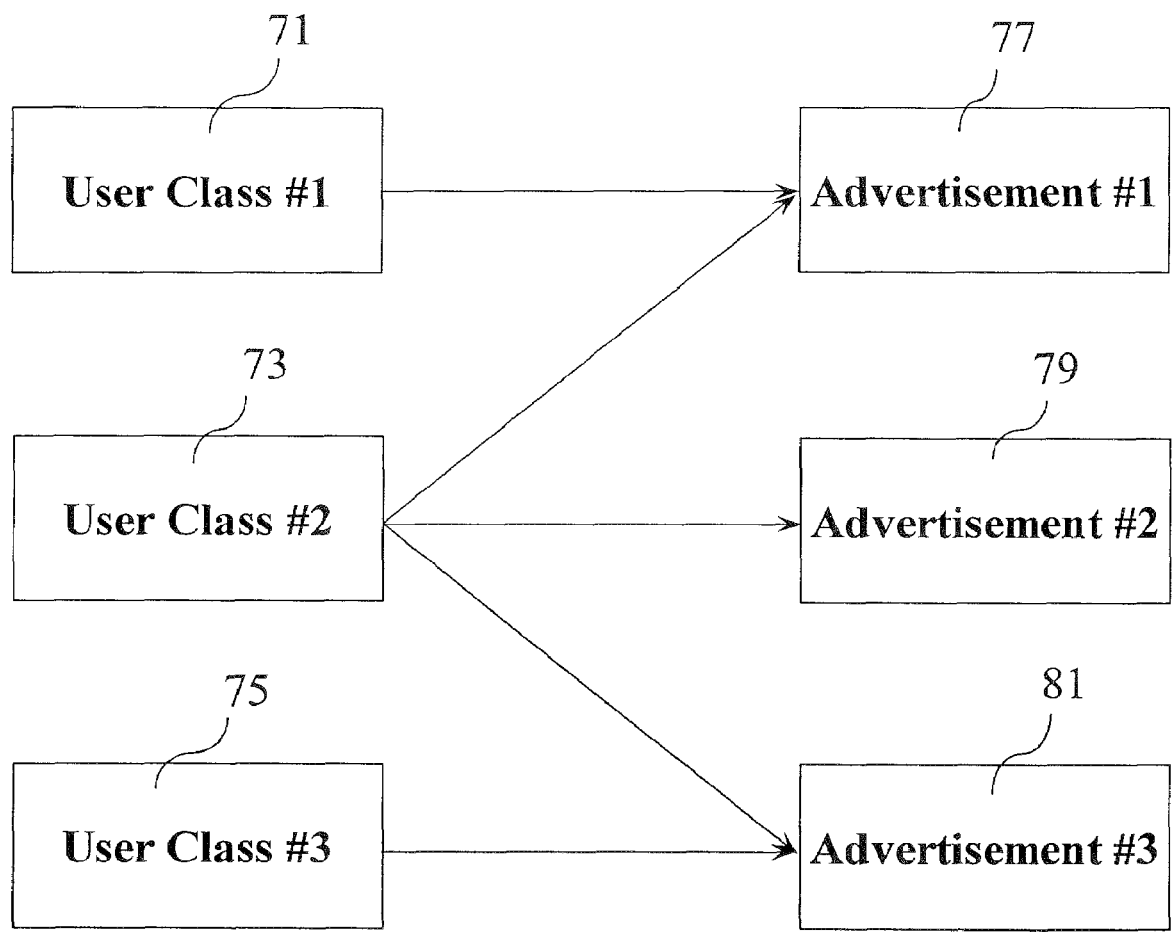
FIG. 6 shows a block diagram of an embodiment according to the present invention.

FIG. 6 shows a block diagram of an embodiment according to the present invention for matching a user classification with a particular advertisement, referred to herein as "matching definitions." The matching definitions are located in the system memory 16 on the server 11 shown in FIG. 2 and are used by the classification module to send instructions for sending incentive, for example, to the broadcast station 19. In the example shown, a first user classification 71 is matched to a first advertisement 77. A second user classification 73 is matched to a first advertisement 77, a second advertisement 79, and a third advertisement 81. A third user classification 75 is matched to a third advertisement 81. The matches are used to define which advertisements are transmitted to which viewers. Therefore, all users, such as the user 17 depicted in FIG. 3, having a first user classification 71 are shown the first advertisement 77. All users having the second user classification 73 are shown the first advertisement 77, the second advertisement 79, and the third advertisement 81. All users having the third classification 75 are shown the third advertisement 81.

EXAMPLE 3

In an illustrative example of an embodiment of the advertisement matches depicted in FIG. 6, the first advertisement 77 is an advertisement for a stock car die cast model, the second advertisement 79 is for a service to purchase sports tickets, and the third advertisement 81 is for football memorabilia. The first user classification 71 is called a stock car racing fan, for example having a user parameter requiring that the user watch an average of one race per week. The first user classification 71 is matched to the first advertisement 77 for a stock car die cast model because a stock car die cast model is probably of interest to a stock car race fan. The second user classification 73 is called an ultra sports fan, for example, having a user parameter requiring that the user watch at least three different sports programs every week. The second user classification 73 is matched to the first advertisement 77 for a stock car die cast model, the second advertisement 79 for the ticket purchasing service, and the third advertisement for football memorabilia because the second user classification 73 has a general interest in sports and all three advertisements are probably of interest. The third user classification 75 is called a football fan, for example, having a user parameter requiring that the user watch an average of two football games per month. The third user classification 75 is matched to the third advertisement 81 for football memorabilia, which is probably of interest to a football fan. Any number of classifications and advertisement matches may be made. For example, the second advertisement 79 for ticket purchasing services, may be of interest to the first, second, and third user classifications, 71, 73, and 75, and therefore, the matching definitions may be changed to map the first, second, and third user classifications, 71, 73, and 75 to the second advertisement 79.

Figure 7:
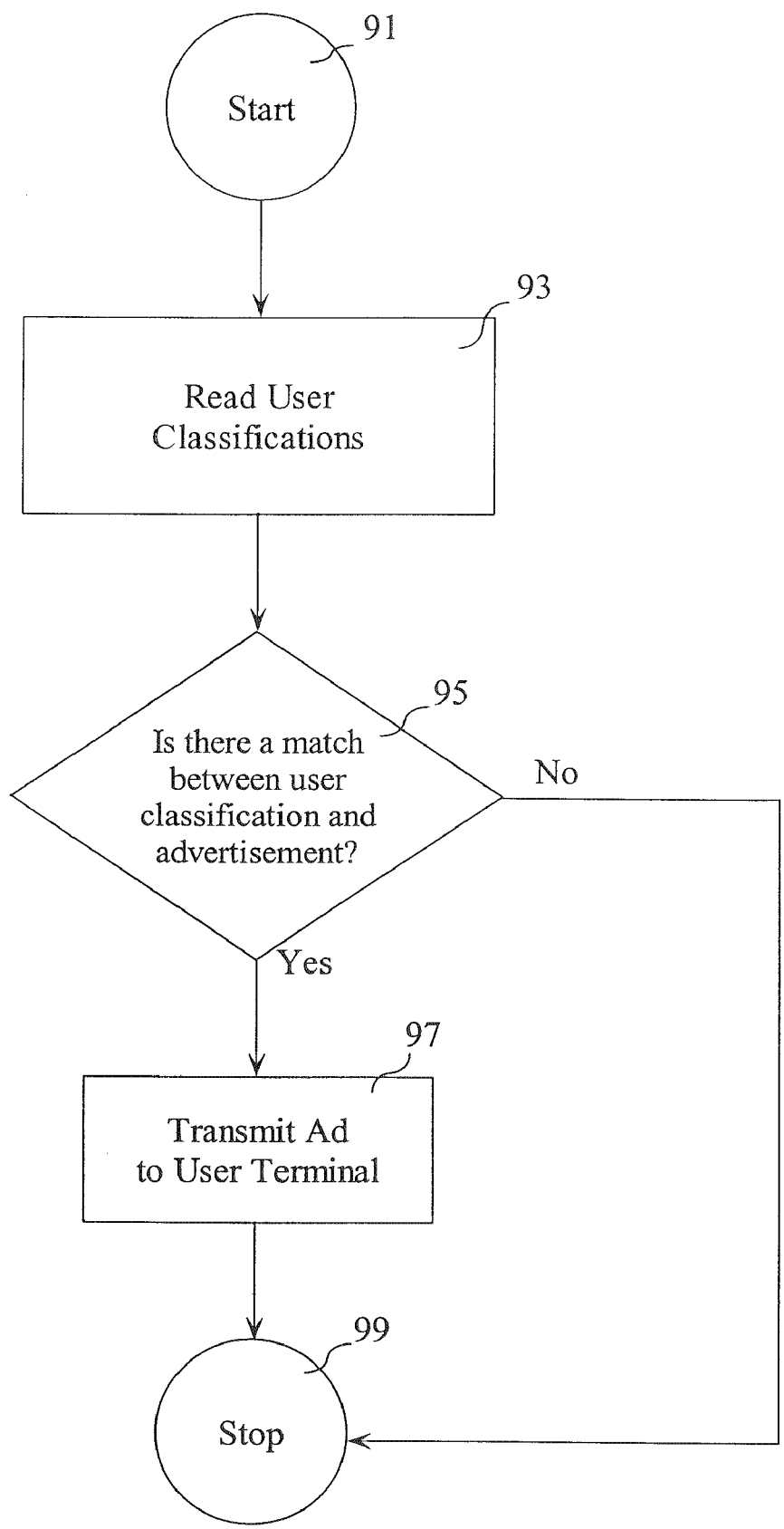
FIG. 7 shows yet another alternative embodiment of a method according to the present invention.

FIG. 7 shows another embodiment of a method according to the present invention. The classification module 13 as depicted in FIG. 1 sends transmission instructions to the broadcast station 19. As discussed above, the server 11 includes user data 17 and advertisement data 15. The advertisement data 15 includes information identifying one or more specific advertisement. The classification module 13 includes matching definitions, such as the matching definitions depicted in FIG. 6. User classifications are matched to one or more advertisements. In one embodiment, the user to which the broadcast is sent is identified by the address of the user terminal, such as one of the user terminals 21a-21n. The user terminal address 31 is depicted in FIG. 3 and is a component of the user data 17. In another embodiment, a user at one of the user terminals 21a-21n in FIG. 1 may be prompted at the user terminal 21a-21n to input a user identification, such as a code or password. Therefore, the system identifies the user by a code such that multiple users at the same user terminal may be distinguished.

Referring again to FIG. 7, the classification module begins at step 91. The classification module 13 reads the user classifications assigned to a particular user terminal stored as user data 17 at step 93, such as user classifications 33, 35 and 37 as depicted in FIG. 3. The classification module 13 determines whether there is a match defined between the user classifications and a particular advertisement at step 95 using matching definitions such as the matching definitions depicted in FIG. 6. If there are no matches defined between a user classification assigned to a particular user and advertisements, the classification module 13 stops at step 99. If there is a defined match, the classification module 13 sends instructions to the broadcast terminal to transmit the advertisement to the user at step 97.

In the embodiment shown in FIG. 1, the broadcast station 19 transmits the advertisements to the user terminal 21a-21n by overriding default advertisements. The broadcast from the broadcast station 19 typically includes default advertisements. The instructions to transmit the advertisement to the user may include instructions to override default advertisements in the broadcast media with advertisements for which a match has been determined. If a user classification is matched to more than one advertisement, the matched advertisements are transmitted to the user at different times and more than one default advertisement may be overridden.

EXAMPLE 4

In one illustrative example for transmitting advertisements to a user, a first user and a second user use the same user terminal, specifically user terminals 21a in FIG. 1, for viewing television. The first and second users are assigned separate identification codes, which are recorded in the system memory 16 for identifying the user. The identification codes may be assigned by a central administrator and communicated to the first and second users by electronic or mail messages, or the first and second users may choose an identification code and enter it to the user terminal 21a. The user terminal 21a sends the code to the system memory 16. The first user views a stock car race every Saturday and Sunday afternoon, and the classification module analyzes the user data as described in Example 1 to determine that the first user is classified as a "sports viewer." In the example, the user classification parameter for a sports viewer is a requirement that the user view at least three hours of sports shows on average per week. The second user watches nothing but cooking shows and has not been assigned a user classification.

An advertiser for a tennis shoe orders an advertisement to be sent to all "sports viewers" matching the defined classification. An operator adds the information about the advertisement to the advertisement data 15 in FIG. 1, including information identifying the advertisement. The operator also adds a match between the user classification "sports viewer" and the tennis shoe advertisement. The media content that comprises the advertisement is transmitted to the broadcast station 19.

The first user turns on user terminal 21a to watch the Saturday stock car race. The user terminal 21a prompts the first user for a user identification code. Once the first user's identification code is received, the user terminal 21a transmits the identification code to the broadcast station 19 and the server 11. The user terminal 21a also transmits the identification number of the user terminal 21a to the broadcast station 19 and the server 11. The user data collected, such as user data 17 as depicted in FIG. 3, is therefore identified as associated with the first user.

The classification module 11 in FIG. 1 has previously determined that the first user is classified as a "sports viewer" through a process such as the process described in Example 1. The "sports viewer" classification is stored as a first user classification 33 in the user data 17 as depicted in FIG. 3.

Referring to FIG. 7, the classification module begins at step 91. The classification module reads the user classifications assigned to the first user at user terminal 21a at step 93. Specifically, the classification module reads the "sports viewer" user classification. The classification module determines whether there is a match defined between the user classifications and a particular advertisement at step 95. Because a match has been defined between the tennis shoe advertisement and the "sports viewer" user classification, at step 97 the classification module sends instructions to the broadcast terminal to transmit the advertisement to the user at step 97.

Referring back to FIG. 1, the broadcast terminal 19 receives the instructions from the classification module 13 to transmit the tennis shoe advertisement to the user. The broadcast station 19 replaces a default advertisement in the broadcast programming with the tennis shoe advertisement.

If the second user identification were entered into the user terminal 21a, the classification module 13 would not detect a match between the user classifications and the advertisements at step 95 in FIG. 7. The classification module would stop at step 99, and no instructions to replace default advertisements in the broadcast programming would be sent.

It will be apparent to those with skill in the art that there are many alterations that may be made in the embodiments of the invention described above without departing from the spirit and scope of the invention. For example, there are many ways that circuits and electronic elements may be combined to implement the method and system described herein in various systems and hardware environments. The present invention may be implemented in various network environments, including wireless and computer networks, or other networks supporting electronic devices and the transmission of media content in television, radio, Internet or other network environments. There are similarly many ways that independent programmers might provide software to provide the functionality associated with the present invention as taught herein without departing from the spirit and scope of the invention. Having thus generally described the invention, the same will become better understood from the following claims in which it is set forth in a non-limiting manner.

What is claimed is:

1. A method, comprising:
forming at least one event record comprising at least one command from at least one subscriber and a time associated with the at least one command;
merging data describing the at least one event record with data describing media programming to form data describing an event timeline that describes the at least one command and the media programming selected by the at least one subscriber over a period of time;
retrieving purchasing data describing the at least one subscriber's purchase;
comparing the data describing the event timeline to the purchasing data; and
classifying the at least one subscriber in a category when the data describing the event timeline indicates that the at least one subscriber viewed an advertisement and the purchasing data indicates that the at least one subscriber afterwards purchased an advertised product or service.

2. The method of claim 1, wherein retrieving the purchasing data comprises retrieving credit card purchase records.

3. The method of claim 1, wherein retrieving the purchasing data comprises retrieving online purchase records.

4. The method of claim 1, further comprising obtaining demographic information associated with the at least one subscriber.

5. The method of claim 1, further comprising matching the at least one subscriber's category to a targeted advertisement.

6. The method of claim 1, further comprising inserting the targeted advertisement into the media programming.

7. The method of claim 1, further comprising comparing the data describing the event timeline to a web page viewed by the at least one subscriber.

8. The method of claim 7, further comprising classifying the at least one subscriber in another category when the data indicates that the at least one subscriber viewed the web page and afterwards the purchasing data indicates that the at least one subscriber made a corresponding purchase.

9. The method of claim 1, further comprising defining a parameter for membership in the category.

10. The method of claim 1, further comprising defining a viewing time for membership in the category.

11. The method of claim 1, further comprising defining a purchased product for membership in the category.

12. The method of claim 1, further comprising defining a minimum number of viewed advertisements for membership in the category.

13. The method of claim 1, further comprising classifying the at least one subscriber when a defined amount of product is purchased.

14. The method of claim 1, wherein the advertisement comprises an image embedded into media content.

15. The method of claim 1, wherein the advertisement comprises a video program.

16. The method of claim 1, wherein the advertisement comprises a banner.

17. The method of claim 1, further comprising classifying the at least one subscriber in a plurality of categories according to parameters defining membership in each category.

18. The method of claim 1, further comprising targeting the at least one subscriber to an advertiser.

19. A system, operative to:

form at least one event record comprising at least one command from at least one subscriber and a time associated with the at least one command;

merge data describing the at least one event record with data describing media programming to form data describing an event timeline that describes the at least one command and the media programming selected by the at least one subscriber over a period of time;

retrieve purchasing data describing the at least one subscriber'purchase;

compare the data describing the event timeline to the purchasing data; and classify the at least one subscriber in a category when the data describing the event timeline indicates that the at least one subscriber viewed an advertisement and the purchasing data indicates that the at least one subscriber afterwards purchased an advertised product or service.

20. Computer readable memory storing processor executable instructions for performing a method, the method comprising:

forming, by a processor, at least one event record comprising at least one command from at least one subscriber and a time associated with the at least one command;

merging, by the processor, data describing the at least one event record with data describing media programming to form data describing an event timeline that describes the at least one command and the media programming selected by the at least one subscriber over a period of time;

retrieving purchasing data from memory that describes the at least one subscriber'purchase;

comparing the data describing the event timeline to the purchasing data; and classifying the at least one subscriber in a category when the data from the event timeline indicates that the at least one subscriber viewed an advertisement and the purchasing data indicates that the at least one subscriber afterwards purchased an advertised product or service.

* * * * *